United States Patent Office 2,812,019
Patented Nov. 5, 1957

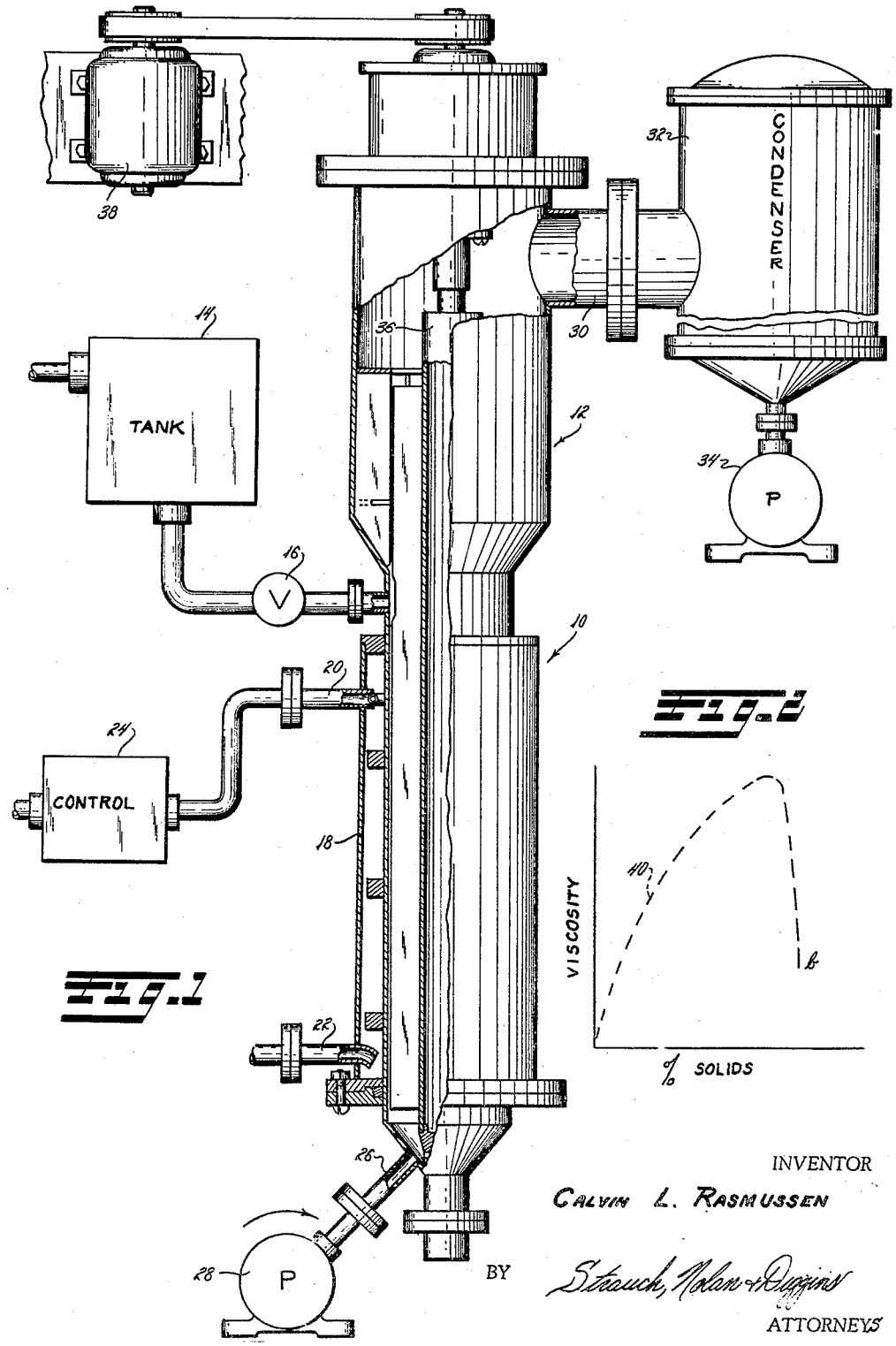

2,812,019

TREATMENT OF LECITHIN

Calvin L. Rasmussen, Orange, Mass., assignor to Rodney Hunt Machine Company, Orange, Mass., a corporation of Massachusetts Application September 22, 1954, Serial No. 457,631

2 Claims. (Cl. 159—49)

The present invention relates to the treatment of lecithin and more particularly to the removal of water from soy bean lecithin.

In commercial production lecithin as extracted from soy beans and purified usually has a moisture content of about 20 to 50%. The lecithin is then dried, that is, its moisture content is reduced to about 1%, and the dried lecithin is packaged and sold. As moisture is removed, the viscosity of lecithin first increases to a maximum and then decreases. At the maximum viscosity, lecithin is a semi-solid while at lower moisture contents the lecithin becomes fluid again.

Heretofore lecithin has been dried by a batch process in which the lecithin is heated in an evacuated vessel until the moisture is driven off. Since lecithin decomposes under excessive heat, very low pressures as low as 1 mm. of mercury absolute are used and the heating is continued for from two to four or even six hours. Because of this viscosity peak, it is impractical in the batch process to keep the lecithin thoroughly agitated at all times during drying. The lecithin adjacent the wall of the vessel receives more heat than that at the center so that there is danger of burning or decomposition adjacent the vessel wall and insufficient water removal at the center of the vessel. Further, even though low pressures are used the pressure within the vessel will vary due to hydrostatic head.

It is a principal object of the present invention to provide a method for removing moisture from undried lecithin by minimizing the effect of the concentration-viscosity relations.

Another object is to provide a continuous process for drying lecithin.

Another object is to provide a method of drying lecithin in which the lecithin is subjected to substantially uniform drying temperature for only a brief period of time.

Another object is to provide a method of drying lecithin uniformly without burning or decomposition.

These and other objects and advantages reside in novel features and in steps and processes as will hereinafter be more fully set forth and pointed out in the appended claims.

In the drawing:

Figure 1 is a diagrammatic elevation of one form of apparatus for carrying out the present invention.

Figure 2 is a graph illustrating the variation of the viscosity of lecithin with water content.

The preferred form of apparatus as illustrated in the drawing is a thin-film evaporator of the type shown in Patent No. 2,596,086. This apparatus consists of an evaporator section designated generally at 10 and a separator section designated generally at 12. The lecithin to be dried is fed into the apparatus from a suitable tank or source 14 under the control of a valve or pump 16 and enters the apparatus between the evaporator section 10 and the separator section 12. Since the lecithin is quite viscous or semi-solid at lower temperatures and higher solids contents, a positive displacement pump such as a Moyno pump is ordinarily used.

The evaporator section 10 is provided with heating means such as a steam jacket 18 having an inlet 20 and outlet 22 and a suitable thermostat or other temperature control mechanism 24 is provided in the inlet line 20 to control the temperature within the steam jacket. The dried lecithin is withdrawn from the bottom of the evaporator section through an outlet 26 by a suitable pump 28. The vapor is withdrawn from the top of the unit above the evaporator section 12 through a conduit 30 and is condensed in a suitable condenser 32 from which the condensed vapor may be withdrawn by a suitable pump 34. The rotor 36 of the evaporator is driven by a suitable engine or motor 38.

Undried lecithin is a very heavy viscous semi-solid which becomes more fluid as the temperature is increased. At about 180° F. the lecithin begins to show flow characteristics and higher temperatures are preferred. The limiting temperature which can be used is that at which the lecithin will begin to burn or decompose. In present commercial practice, the undried lecithin derived from soy beans is at a temperature of about 180° F. when the extraction and purification is complete.

The curve shown in Figure 2 is plotted from arbitrarily selected units to show the manner in which viscosity varies with water content. The curve 40 shows the manner in which the equilibrium viscosity of lecithin at first increases and then decreases as the water content diminishes from maximum water content at the left to minimum water content at the right. When the viscosity is allowed to reach equilibrium, a maximum is reached at a moisture content of about 4% to 6% at which point the lecithin goes through a waxy, heavy paste state and becomes a semi-solid. Accordingly to the process of the present invention, the water is extracted from a thin film at such a rapid rate that the amount of material at the maximum viscosity-concentration is reduced to an ineffective level with respect to the capacity of the evaporating equipment and the thin film permits agitation and concentration of the high viscosity material without burning and decomposition.

The undried lecithin may be fed to the apparatus at temperatures from about 40° F. to about 180° F. and the water may be extracted at pressures from about 20 mm. to 200 mm. of mercury absolute pressure. The high temperatures and pressures are used when the feed material has a high moisture content and the low temperatures and low pressures are used when the feed material has a low moisture content. The jacket 18 is preferably heated by steam and the steam pressure to obtain a given temperature varies according to the feed rate of the material. Ordinarily the steam pressure in the jacket to obtain proper heating at normal feed rates will be between 10 and 35 pounds per square inch gauge pressure.

Typical operating data for high pressure and low pressure operation are as follows:

(1) High absolute pressure—(50 percent moisture feed):
    Feed_____ 160° F.
    Product_____ 220° F.
    Vapor_____ 160° F.
    Heating steam_____ 260° F.
    Absolute pressure_____ 200 mm. Hg.
    Feed rate_____ 36 lbs./hr./sq. ft.
                                       heating surface.

(2) Low absolute pressure—(20 percent moisture feed):

Feed_____ 85° F.
Product_____ 211° F.
Vapor_____ 117° F.
Heating steam_____ 221° F.
Absolute pressure_____ 18 mm. Hg.
Feed rate_____ 35.5 lbs./hr./sq. ft. heating surface.

In operation the material is heated uniformly and continuously in a thin turbulent film. The water is the only material taken off and the time for a single pass from the inlet 16 to the outlet 26 is only a few (10 to 25) seconds. The rotor 36 is rotated at a speed sufficient to keep the lecithin against the heated chamber wall and speeds lower than those customarily used in this type of equipment may be sufficient. Since the lecithin is subject to heat for only a few seconds, higher temperatures can be used without damage or decomposition and only at a very narrow band during its passage though the apparatus does the lecithin have an opportunity to reach its peak viscosity. The final dried lecithin is withdrawn as a fluid through the outlet 26 at a temperature of about 200° F. to 240° F.

From the foregoing it will be apparent that it is possible to accomplish the objects of my invention and provide a method for removing water from lecithin while maintaining the lecithin in a satisfactory fluid state at a temperature which will not damage or decompose it. Only the water is removed and this is done in a short time and at a high rate of speed.

Various changes can be made in the apparatus and different forms of feed and removal apparatus, heating devices and temperature controls may be used without departing from the spirit of the invention or the scope of the appended claims.

I claim:

1. The process for removing moisture from lecithin containing about 20% to about 50% moisture in a substantially vertical, substantially cylindrical chamber, comprising passing the lecithin downward through said chamber, agitating said lecithin to form a thin turbulent film on the wall of said chamber, applying vacuum to said chamber to maintain said chamber at a pressure of about 20 mm. to 200 mm. Hg. absolute, heating the chamber to a temperature over about 200° F. and separating the vapor from the lecithin.

2. The process for removing moisture from lecithin containing about 20% to about 50% water comprising passing the lecithin downward over a surface in a thin film, applying suction to maintain the pressure on said lecithin between about 20 mm. and about 200 mm. Hg absolute, heating the surface to a temperature sufficient to reduce the moisture content of the lecithin below about 4 to 6 percent, agitating the lecithin film during passage over said surface and removing said lecithin from said surface after about 10 to 25 seconds.

References Cited in the file of this patent

UNITED STATES PATENTS

| | | |
|---|---|---|
| 2,100,277 | Clayton | Nov. 23, 1937 |
| 2,245,537 | Thurman | June 10, 1941 |
| 2,269,772 | Kruse | Jan. 13, 1942 |
| 2,472,193 | Clayton | June 7, 1949 |
| 2,508,624 | Singer et al. | May 23, 1950 |
| 2,546,381 | Zahm | Mar. 27, 1951 |
| 2,596,086 | Muller | May 6, 1952 |
| 2,686,190 | Meyers | Aug. 10, 1954 |